United States Patent Office 3,739,015
Patented June 12, 1973

3,739,015
ESTERS OF p-PHENOXY AND p-ALKOXY CINNAMIC ACID
Toshio Wattanabe, Takeyuki Hashimoto, and Shigeki Yoshimatsu, Osaka, Shigeyuki Takeyama, Yamato-machi, Kita-Adachi-gun, Kohki Takashima, Tokyo, and Kiyoshi Izumi, Urawa, Japan, assignors to Tanabe Seiyaku Co., Ltd., Osaka, Japan
No Drawing. Filed Sept. 4, 1970, Ser. No. 69,900
Int. Cl. C07c 69/76
U.S. Cl. 260—473 R    15 Claims

ABSTRACT OF THE DISCLOSURE

A compound of the formula:

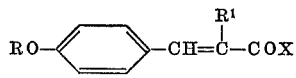

wherein X is a halogen atom, R is a phenyl radical or an alkyl radical having 12–18 carbon atoms and $R^1$ is a hydrogen atom, a methyl radical, or a phenyl radical, is condensed with a compound of the formula:

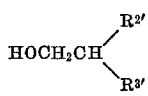

wherein $R^{2'}$ is a hydrogen atom and $R^{3'}$ is a radical selected from the group consisting of methacryloyloxy radical, halomethyl radical, a halogen atom and a radical of the formula:

—SO$_3$Me wherein Me is an alkali metal, or $R^{2'}$ and $R^{3'}$ form together a radical of the formula:

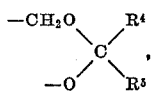

wherein

is the residual moiety of an acetal or a ketal.
An ester compound of the formula:

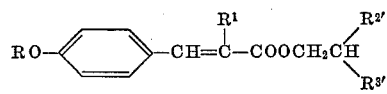

wherein R, $R^1$, $R^{2'}$ and $R^{3'}$ are as defined above, is produced. When $R^{2'}$ and $R^{3'}$ form said radical of the formula:

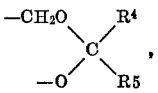

the said residual moiety of an acetal or a ketal is eliminated therefrom to form a resulting product. When $R^{3'}$ is a halogen atom or a halomethyl radical. The resultant product is further hydrolyzed to convert its halogen atom or halomethyl radical respectively to hydroxy radical or hydroxymethyl radical.
A compound is produced which has the formula:

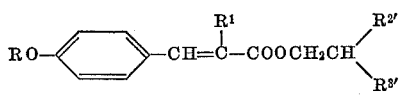

wherein $R^2$ is a hydrogen atom, $R^3$ is a hydroxymethyl radical when $R^2$ is a hydroxy radical or $R^3$ is a radical selected from the group consisting of methacryloyloxy radical, halomethyl radical, hydroxymethyl radical, hydroxy radical, a halogen atom and a radical of the formula:

—SO$_3$Me when $R^2$ is a hydrogen atom and Me is as defined above, R, $R^1$, $R^2$ and $R^3$ are as defined above. The compound is useful as a hypolipemic agent, a hypotriglyceridemic agent and a hypocholesterolemic agent.

This invention relates to novel derivatives of cinnamic acid and to a process for preparing same.
The derivatives are represented by the formula:

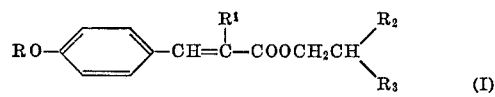

wherein R is a phenyl radical or an alkyl radical having from 12 to 18 carbon atoms, $R^1$ is a hydrogen atom, methyl radical or phenyl radical, $R^2$ is a hydrogen atom or hydroxy radical, and $R^3$ is a hydroxymethyl radical when $R^2$ is a hydroxy radical, or $R^3$ is a radical selected from the group consisting of methacryloxy radical, halomethyl radical, hydroxymethyl radical, hydroxy radical, a halogen atom and a radical of the formula: —SO$_3$Me when $R^2$ is a hydrogen atom, and Me is an alkali metal.

It has been found that the above-mentioned novel derivatives (I) are useful as hypolipemic agents, hypotriglyceridemic agents and hypochloesterolemic agents. In particular, the derivatives (I) of the present invention are characterized by their potent hypotriglyceridemic activity. For example, the γ-chloropropyl ester, the β-hydroxyethyl ester or the β-methacryloyloxyethyl ester of p-cetyloxy-cinnamic acid exhibits a hypotriglyceridemic activity about two times greater than that of Clofibrate (chemical name: etheyl 2-parachlorophenoxy-2-methyl-propionate) which is one of the most effective prior art hypolipemic agents. When Spraugue-Dawley male rats (body weight: 120–130 g.) were maintained for 7 days on a stock diet supplemented with 1% of test compound, each of the above-mentioned compounds decreased the serum-triglyceride value of the rats by 67–75%. In contrast thereto, Clofibrate caused a 34% decrease in the serum-triglyceride. The β-hydroxypropyl ester and the β,γ-dihydroxypropyl ester of p-cetyloxy-cinnamic acid, the γ-chloropropyl ester of p-phenoxy-cinnamic acid and sodium β-(p-cetyloxy-cinnamoyloxy)-ethylsulfonate are examples of other compounds whose hypotriglyceridemic activity is more potent than that of Clofibrate. The derivatives (I) of this invention also have a potent hypocholesterolemic activity. For example, when the above-mentioned rats were maintained in the same conditions as above, the β-chloroethyl ester of p-cetyloxy-cinnamic acid and the β-methacryloyl-oxyethyl ester of α-methyl-p-cetyloxy-cinnamic acid each decreased the serum-cholesterol value of the rats by 28–35%. In contrast thereto. Clofibrate produced a 21% decrease in the serum-cholesterol. Homologues of the above illustrated p-cetyloxy-cinnamic acid esters, wherein the cetyloxy radical is replaced with a stearyloxy, a lauryloxy, or a myristyloxy radical, also have potent hypotriglyceridemic and hypochloesterolemic activity.

The toxicity of the derivatives (I) is relatively low. For example, when administered intraperitoneally in the mouse, the acute toxicity (LD$_{50}$) of the β-methacryloyl-oxyethyl ester and the β-chloroethyl ester of p-cetyloxy-cinnamic acid is in both cases more than 300 mg./kg.

According to the present invention, a compound of the Formula I can be prepared by condensing an acid halide compound represented by the formula:

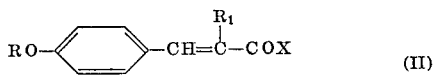

wherein X is a halogen atom, and R and $R^1$ are as defined above, with a compound represented by the formula:

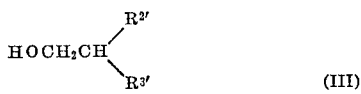

wherein $R^{2\prime}$ is a hydrogen atom and $R^{3\prime}$ is a radical selected from the group consisting of methacryloyloxy radical, halomethyl radical, a halogen atom and a radical of the formula:

$$-SO_3Me \qquad (IV)$$

wherein Me is as defined above, or $R^{2\prime}$ and $R^{3\prime}$ form a radical of the formula:

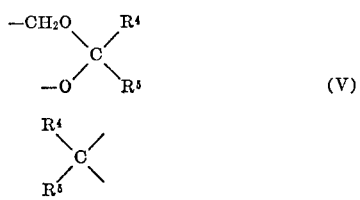

is the residual moiety of an acetal or ketal, to give an ester of the formula:

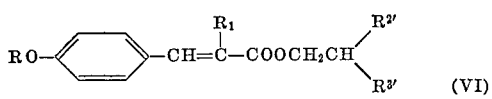

wherein R, $R^1$, $R^{2\prime}$ and $R^{3\prime}$ are as defined above, and when $R^{2\prime}$ and $R^{3\prime}$ form a radical of the Formula V, eliminating the said residual moiety of an acetal or a ketal therefrom, and, if required, when $R^{3\prime}$ is a halogen atom or a halomethyl radical, further hydrolyzing the product (VI) to convert its halogen atom or halomethyl radical respectively to hydroxy radical or hydroxymethyl radical. Preferred examples of the residual moiety

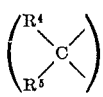

of the above acetal or ketal include the ethylidene radical, the isopropylidene radical, the benzylidene radical and the cyclohexylidene radical.

The condensation reaction of the invention can be accomplished in a conventional manner. For example, the reaction may be carried out at room temperature or at an elevated temperature in a suitable solvent. The use of a base such as pyridine, triethylamine, sodium hydroxide or sodium bicarbonate is not essential for the purpose of the invention. However, it is preferred to carry out the reaction in the presence of such a base as stated above. When $R^{2\prime}$ and $R^{3\prime}$ form a radical of the Formula V, the compound (VI) thus obtained can be separated from the reaction solution and hydrolyzed to eliminate the said residual moiety

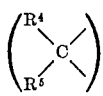

of an acetal or ketal. Alternatively, the compound (VI) can be directly hydrolyzed without such separation. A conventional acid hydrolysis can be employed. For example, the reaction can be carried out by refluxing the compound (VI) with dilute hydrochloric acid, formic acid or an acid resin (e.g., Dowex 50) in a suitable solvent.

When $R^{3\prime}$ is a halogen atom or a halomethyl radical, the compound (VI) of this invention may be, if required, hydrolyzed to convert its halogen atom or halomethyl radical respectively to hydroxy radical or hydroxymethyl radical. The reaction can be carried out by refluxing the compound (VI) with a suitable solvent in the presence of a silver salt (e.g., silver nitrate, silver nitrite, silver carbonate, silver hydroxide, silver sulfate). Aqueous methanol, aqueous ethanol, dimethyl formamide or dioxane are the preferred reaction solvents.

The separation and/or purification of the cinnamic acid derivative (I) may be performed by any appropriate procedure. For example, recrystallization from a suitable solvent (e.g., ethanol, methanol, ethyl acetate), or treatment with an alumina- or silica gel-column followed by eluting the column with a suitable solvent (e.g., chloroform, benzene, ethyl acetate).

The cinnamic acid derivatives (I) of this invention may be administered, in association with a pharmacologically acceptable carrier, orally or parenterally. Pharmaceutical preparations such as for example tablets, coated tablets, pills, capsules, solutions, suspensions or emulsions may be employed. They may be sterilized and/or may contain auxiliaries, such as preserving, stabilizing, wetting or emulsifying agents. They may further contain other therapeutically valuable substances.

Practical and presently-preferred embodiments of the invention are shown in the following examples. These examples are given only for the purpose of illustrating the present invention and not for the purpose of limiting same.

EXAMPLE 1

8.15 g. of p-cetyloxy-cinnamoyl chloride are dissolved in 50 ml. of absolute benzene. 3 g. of β-hydroxyethyl methacrylate are added dropwise to the solution at 50° C. The solution is refluxed on a water bath for one hour, and then concentrated under reduced pressure. The residue is washed with water and an aqueous saturated solution of sodium bicarbonate. The resultant product is recrystallized from ethanol. 5.6 g. of the β-methacryloyloxyethyl ester of p-cetyloxy-cinnamic acid are obtained. M.P. 46–48° C. Colorless needles.

*Analysis.*—Calculated for $C_{31}H_{48}O_5$ (percent): C, 74.36; H, 9.66. Found (percent): C, 74.50; H, 9.49.

EXAMPLE 2

3.8 g. of triethylene chlorohydrin are dissolved in 30 ml. of absolute benzene. A solution of 8.1 g. of p-cetyloxycinnamoyl chloride in 70 ml. of absolute benzene is added dropwise to the solution. The addition is carried out at 50–60° C. for about 30 minutes under stirring.

The solution is then refluxed for 2.5 hours. The reaction solution is concentrated under reduced pressure. The residue is recrystallized from ethanol. 6.1 g. of the γ-chloropropyl ester of p-cetyloxy-cinnamic acid are obtained. M.P. 46–47° C. Colorless needles.

Infrared absorption spectrum (KBr)

$\nu$: 1710 cm.$^{-1}$ (CO), 1635, 1610 cm.$^{-1}$ (C=C)

*Analysis.*—Calculated for $C_{28}H_{45}O_3Cl$ (percent): C, 72.30; H, 9.75; Cl, 7.62. Found (percent): C, 72.45; H, 9.88; Cl, 7.83.

EXAMPLE 3

3.9 g. of p-cetyloxy-cinnamic acid and 1.3 g. of dimethylchloroformiminium chloride are added to 30 ml. of absolute chloroform. The mixture is refluxed for 30 minutes and then cooled to room temperature. 1.6 g. of 1,2-isopropyridene glycerol are added to the mixture. The mixture is refluxed for one hour. The reaction mixture is evaporated to remove the solvent. 100 ml. of 0.5 N hydrochloric acid-ethanol (2:3) are added to the residue and the mixture is heated at 65–70° C. under stirring. The mixture is extracted with chloroform. The extract is washed with an aqueous saturated solution of sodium bicarbonate and water. Then, the extract is dried and evaporated to remove the solvent. The crystals are recrystallized from ethylacetate. 1.12 g. of the α-monoglyceride of p-cetyloxy-cinnamic acid are obtained. M.P. 86–88° C. Scaly crystals.

Infrared absorption spectrum:

$\nu_{cm.^{-1}}^{KBr}$: 1710 (CO), 1643 (C=C)

*Analysis.*—Calculated for $C_{28}H_{46}O_5$ (percent): C, 72.69; H, 10.02. Found (percent): C, 73.35; H, 9.93.

EXAMPLE 4

A solution of 4.1 g. of p-cetyloxy-cinnamoyl chloride in 20 ml. of absolute benzene is added dropwise to a solution of 2.7 g. of 1,2-benzylidene-glycerol and 2 ml. of pyridine in 15 ml. of absolute benzene. The addition is carried out at room temperature for 40 minutes under stirring. The solution is then stirred for 5 hours at room temperature. The reaction solution is washed with water, 5% hydrochloric acid and water. The solution is evaporated to remove the solvent. 60 ml. of ethanol-formic acid (2.1) are added to the residue and the mixture is refluxed for one hour. The solution is evaporated to remove the solvent. The crystals are recrystallized from ethyl acetate. 1.62 g. of the α-monoglyceride of p-cetyloxy-cinnamic acid are obtained. M.P. 86–88° C. Scaly crystals.

EXAMPLE 5

1.1 g. of β-hydroxyethyl methacrylate and 2 g. of pyridine are dissolved in 10 ml. of absolute benzene. A solution of 2.1 g. of α-methyl - p - cetyloxy - cinnamoyl chloride in 20 ml. of absolute benzene is added dropwise to the solution. The addition is carried out at room temperature for 40 minutes under stirring. Then, the solution is stirred for 6 hours at room temperature. The reaction solution is washed successively with water, 5% hydrochloric acid, an aqueous saturated solution of sodium bicarbonate and water. The solution is dried and evaporated to remove the solvent. The crystals are dissolved in 50 ml. of ethanol at 50° C. The insoluble materials are removed by filtration. The filtrate is allowed to stand at room temperature. The precipitated crystals are collected by filtration. 1.7 g. of the β-methacryloyloxyethyl ester of α-methyl-p-cetyloxy-cinnamic acid are obtained. M.P. 45–46° C.

Infrared absorption spectrum (KBr):

$\nu_{cm.^{-1}}^{KBr}$: 1715 (CO), 1635 (C=C)

*Analysis.*—Calculated for $C_{32}H_{50}O_5$ (percent): C, 74.67; H, 9.79. Found (percent): C, 75.13; H, 9.95.

EXAMPLE 6

4.51 g. of the β-chloroethyl ester of p-cetyloxy-cinnamic acid are dissolved in 110 ml. of ethanol-water (10:1). 2.6 g. of silver nitrate are added to the solution and the solution is refluxed for 3 hours. The insoluble materials are removed by filtration. The filtrate is evaporated to remove the solvent. The residue is adsorbed on an alumina-column. The column is eluted with benzene, and the eluates showing the Rf-value of 0.21 on a thin layer chromatograph of alumina (solvent:benzene) are collected. The benzene solution is evaporated to remove the solvent. 1.35 g. of the β-hydroxyethyl ester of p-cetyloxy-cinnamic acid are obtained. M.P. 68–69° C.

Infrared absorption spectrum:

$\nu_{cm.^{-1}}^{KBr}$: 3400 (OH), 1701 (CO), 1639 (C=C)

*Analysis.*—Calculated for $C_{26}H_{44}O_4$ (percent): C, 72.24; H, 10.54. Found (percent): C, 72.13; H, 10.60.

EXAMPLE 7

5.20 g. of p-phenoxy-cinnamoyl chloride are added to a solution of 2.84 g. of trimethylene chlorohydrin and 5 ml. of pyridine in 20 ml. of absolute benzene. The solution is refluxed for one hour, and then cooled. The solution is washed with 10% hydrochloric acid, an aqueous saturated solution of sodium bicarbonate and water. The solution is then dried and evaporated to remove the solvent. The residue is distilled under a pressure of 0.2 mm. Hg. 4.58 g. of the γ-chloropropyl ester of p-phenoxy-cinnamic acid boiling at 208–210° C. are obtained.

Infrared absorption spectrum:

$\nu_{cm.^{-1}}^{KBr}$: 1720 (CO), 1638 (C=C)

EXAMPLE 8

A solution of 6.1 g. of silver nitrate in 10 ml. of water is added to a solution of 5.6 g. of the γ-chloropropyl ester of p-cetyloxy-cinnamic acid in 100 ml. of ethanol. The solution is refluxed on a water bath for 7 hours under stirring. The insoluble materials are removed by filtration. The filtrate is concentrated under reduced pressure. The residue is dried and then dissolved in hot benzene. The insoluble materials are removed by filtration. The filtrate is concentrated to dryness and the residue is cooled. The scaly crystals are recrystallized from ethanol. 3.6 g. of the γ-hydroxypropyl ester of p-cetyloxy-cinnamic acid are obtained. M.P. 102–103° C.

Infrared absorption spectrum:

$\nu_{cm.^{-1}}^{KBr}$: 3350 (OH), 1700 (CO), 1600 (C=C)

*Analysis.*—Calculated for $C_{28}H_{46}O_4$ (percent): C, 75.29; H, 10.38. Found (percent): C, 75.51; H, 10.40.

EXAMPLE 9

4.1 g. of p-cetyloxy-cinnamoyl chloride and 4.45 g. of sodium isethionate are dissolved in absolute toluene. The solution is refluxed for 2.5 hours under stirring. The reaction solution is evaporated to remove the solvent. The residue is dried and then washed with water to remove the remaining sodium isethionate. After washing with hot ethanol, the residue is recrystallized from 80% aqueous ethanol. 2.8 g. of sodium β-(p-cetyloxy-cinnamoyloxy)-ethylsulfonate are obtained. M.P.>300° C. Colorless needles.

Infrared absorption spectrum:

$\nu_{cm.^{-1}}^{KBr}$: 1710 (CO), 1638, 1605 (C=C)

Thin layer chromatography of silica gel (solvent:methylethylketone saturated with water) of sodium β-(p-cetyloxy-cinnamoyloxy)-ethylsulfonate is Rf 0.32 and p-cetyloxy-cinnamic acid is Rf 0.08, respectively.

*Analysis.*—Calculated for $C_{27}H_{43}O_6SNa$ (percent): C, 62.52; H, 8.36; S, 6.18. Found (percent): C, 62.59; H, 8.40; S, 6.50.

EXAMPLE 10

A solution of 4.1 g. of p-cetyloxy-cinnamoyl chloride in 20 ml. of absolute chloroform is added to a solution of 1.6 g. of ethylene chlorohydrin and 2 ml. of pyridine in 20 ml. of absolute chloroform. The addition is carried out for 20 minutes under ice-cooling and stirring. The solution is stirred for 3 hours at room temperature. After the reaction, water is added to the solution until pyridine hydrochloride is dissolved in it, and the chloroform layer is separated. The chloroform solution is washed with 5% hydrochloric acid and water. The solution is evaporated to remove the solvent. The residue is recrystallized from ethanol. 3.74 g. of the β-chloroethyl ester of p-cetyloxy-cinnamic acid are obtained. M.P. 67–67.5° C.

Infrared absorption spectrum:

$\nu_{cm.^{-1}}^{KBr}$: 1700 (CO), 1629 (C=C)

*Analysis.*—Calculated for $C_{27}H_{43}O_3Cl$ (percent): C, 71.89; H, 9.61. Found (percent): C, 72.37; H, 9.63.

EXAMPLE 11

A solution of 4.20 g. of α-methyl-p-cetyloxy-cinnamoyl chloride in 20 ml. of absolute benzene is added to a solution of 1.61 g. of ethylene chlorohydrin and 3 ml. of pyridine in 15 ml. of absolute benzene. The addition is carried out at 40–50° C. for 50 minutes under stirring.

The solution is then stirred for 3 hours at room temperature. The reaction solution is evaporated to remove the solvent and the residue is cooled. The crystals are washed with dilute hydrochloric acid and water. The crystals are dried and recrystallized from ethanol. 3.97 g. of the β-chloroethyl ester of α-methyl-p-cetyloxy-cinnamic acid are obtained. M.P. 60–62° C.

Infrared absorption spectrum:

$\nu_{cm.^{-1}}^{KBr}$: 1700 (CO)

*Analysis.*—Calculated for $C_{28}H_{45}O_3Cl$ (percent): C, 72.30; H, 9.75. Found (percent): C, 72.59; H, 9.66.

EXAMPLE 12

A solution of 4.20 g. of α-methyl-p-cetyloxy-cinnamoyl chloride in 20 ml. of absolute benzene is added to a solution of 2.64 g. of 1,2-isopropylidene-glycerol and 2 ml. of pyridine in 20 ml. of absolute benzene. The addition is carried out for 45 minutes at room temperature under stirring. The solution is then stirred for 5 hours at room temperature. The solution is evaporated to remove the solvent and the residue is cooled. The crystals are washed with dilute hydrochloric acid and water. The crystals are dried and recrystallized from ethanol. 3.38 g. of the 1,2-isopropylidene-glyceride of α-methyl-p-cetyloxy-cinnamic acid are obtained. M.P. 52–53° C.

1.4 g. of the crystals are dissolved in 50 ml. of ethanol. 10 ml. of 10% formic acid are added to the solution and the solution is refluxed for 5 hours. The solution is evaporated under reduced pressure to remove the solvent. An aqueous saturated solution of sodium bicarbonate is added to the residue and the residue is finely ground. The solvent is removed then the residue is dried and recrystallized from ethylacetate. 750 mg. of the α-monoglyceride of α-methyl-p-cetyloxy-cinnamic acid are obtained. M.P. 88–90° C.

Infrared absorption spectrum:

$\nu_{cm.^{-1}}^{KBr}$: 3400 (OH), 1705 (CO)

*Analysis.*—Calculated for $C_{29}H_{48}O_5$ (percent): C, 73.07; H, 10.15. Found (percent): C, 73.23; H, 10.13.

EXAMPLE 13

A solution of 3.4 g. of silver nitrate in 5 ml. of water is added to a solution of 2.33 g. of the β-chloroethyl ester of α-methyl-p-cetyloxy-cinnamic acid in 55 ml. of ethanol, and the solution is refluxed for 3 hours. The insoluble materials are removed by filtration. The filtrate is concentrated under reduced pressure. The residue is dissolved in chloroform and the insoluble materials are removed by filtration. The filtrate is dried and evaporated to remove the solvent. The residue is adsorbed on an alumina-column. The column is eluted with chloroform, and eluates showing an Rf-value of 0.41 on a thin layer chromatograph of alumina (solvent:chloroform) are collected. The chloroform solution is evaporated to remove the solvent. 600 mg. of the β-hydroxyethyl ester of α-methyl-p-cetyloxy-cinnamic acid are obtained. M.P. 61–62° C.

Infrared absorption spectrum:

$\nu_{cm.^{-1}}^{KBr}$: 3400 (OH), 1710 (CO)

*Analysis.*—Calculated for $C_{28}H_{46}O_4$ (percent): C, 75.29; H, 10.38. Found (percent): C, 75.30; H, 10.27.

EXAMPLE 14

2.1 g. of α-methyl-p-cetyloxy-cinnamoyl chloride are dissolved in 25 ml. of absolute benzene. 888 mg. of sodium isethionate are added to the benzene solution. The resultant solution is refluxed for 10 hours. The precipitated crystals are collected by filtration and washed successively with chloroform, ethanol, water and ethanol. The crystals are dried and recrystallized from 80% ethanol. 680 mg. of sodium β-(α-methyl-p-cetyloxy-cinnamoyloxy)-ethyl-sulfonate are obtained. M.P. 300° C.

Infrared absorption spectrum:

$\nu_{cm.^{-1}}^{KBr}$: 1711 (CO), 1638 (C=C)

*Analysis.*—Calculated for $C_{28}H_{45}O_6SNa$ (percent): C, 63.13; H, 8.52; S, 6.02. Found (percent): C, 63.16; H, 8.60; S, 6.07.

EXAMPLE 15

A solution of 4.02 g. of α-methyl-p-cetyloxycinnamoyl chloride in 20 ml. of absolute benzene is added to a solution of 1.42 g. of trimethylene chlorohydrin and 3 ml. of pyridine in 15 ml. of absolute benzene. The addition is carried out for one hour at 0–5° C. under stirring. The solution is then stirred for 4 hours at room temperature. The reaction solution is evaporated to remove the solvent, and the residue is cooled. The crystals are washed with dilute hydrochloric acid and water. The crystals are dried, and recrystallized from ethylacetate. The precipitated crystals are removed by filtration. The filtrate is concentrated to dryness. The residue is recrystallized from ethanol. 3.86 g. of the γ-chloropropyl ester of α-methyl-p-cetyloxy-cinnamic acid are obtained. M.P. 57–59° C.

Infrared absorption spectrum:

$\nu_{cm.^{-1}}^{KBr}$: 1708 (CO), 1635 (C=C)

*Analysis.*—Calculated for $C_{29}H_{49}O_3Cl$ (percent): C, 72.69; H, 9.88. Found (percent): C, 73.14; H, 9.84.

EXAMPLE 16

A solution of 3.4 g. of silver nitrate in 5 ml. of water is added to a solution of 2.57 g. of the γ-chloropropyl ester of α-methyl-p-cetyloxy-cinnamic acid in 55 ml. of ethanol, and the solution is refluxed on a water bath for 4 hours under stirring. The insoluble materials are removed by filtration. The filtrate is concentrated under reduced pressure. The residue is dried and then dissolved in hot benzene. The insoluble materials are again removed by filtration and the filtrate is concentrated to dryness. The residue is adsorbed on a silica gel-column. The column is eluted with benzene, and the eluates showing an Rf-value of 0.21 on a silica-gel thin layer chromatography (solvent:chloroform) are collected. The benzene solution is evaporated to remove the solvent, and the residue is recrystallized from ethanol. 320 mg. of the γ-hydroxypropyl ester of α-methyl-p-cetyloxy-cinnamic acid are obtained. M.P. 48–49° C.

Infrared absorption spectrum:

$\nu_{cm.^{-1}}^{KBr}$: 3400 (OH), 1710 (CO), 1635 (C=C)

*Analysis.*—Calculated for $C_{29}H_{48}O_4$ (percent): C, 75.60; H, 10.50. Found (percent): C, 75.87; H, 10.41.

EXAMPLE 17

A solution of 3.9 g. of p-phenoxy-cinnamoyl chloride in 25 ml. of absolute benzene is added to a solution of 2.1 g. of β-hydroxyethyl methacrylate and 1.6 g. of pyridine in 20 ml. of absolute benzene. The addition is carried out for about 30 minutes at room temperature under stirring. The solution is stirred for 2 hours at room temperature and then heated at 40–45° C. for 30 minutes. The reaction solution is washed with 5% hydrochloric acid and water. The solution is dried and then evaporated to remove the solvent. The residue is distilled under a pressure of 0.05 mm. Hg. 3.1 g. of the α-methacryloxyethyl ester of p-phenoxy-cinnamic acid boiling at 185–188° C. as an oil are obtained. Oil.

Infrared absorption spectrum:

$\nu_{cm.^{-1}}^{KBr}$: 1717 (CO), 1637 (C=C)

Thin layer chromatography of alumina (solvent: benzene) is Rf 0.58.

*Analysis.*—Calculated for $C_{21}H_{20}O_5$ (percent): C, 71.58; H, 5.72. Found (percent): C, 71.67; H, 5.69.

EXAMPLE 18

A solution of 4.8 g. of silver nitrate in 48 ml. of water is added to a solution of 2.98 g. of the γ-chloropropyl ester of p-phenoxy-cinnamic acid in 480 ml. of ethanol. The solution is refluxed on a water bath for 14 hours under stirring. The insoluble materials are removed by filtration. The filtrate is concentrated to dryness. The residue is adsorbed on an alumina column, and the column is eluted with chloroform. The eluate is then evaporated to remove the solvent. 1.8 g. of the γ-hydroxypropyl ester of p-phenoxy-cinnamic acid are obtained. Oil.
Infrared absorption spectrum:

$\nu_{cm.^{-1}}^{film}$: 3370 (OH), 1705 (CO), 1630 (C=C)

Analysis. — Calculated for $C_{18}H_{18}O_4$ (percent): C, 72.46; H, 6.08. Found (percent): C, 72.35; H, 5.98.

EXAMPLE 19

A solution of 4.50 g. of α-methyl-p-stearyloxy-cinnamoyl chloride in 20 ml. of absolute chloroform is added to a solution of 1.60 g. of 1,2-isopropylidene-glycerol and 2 ml. of pyridine in 20 ml. of absolute chloroform. The addition is carried out at room temperature for 30 minutes under stirring. Then, the solution is stirred at room temperature for 4 hours. The solution is washed with water and then evaporated to remove the solvent. The residue is dissolved in 80 ml. of ethanol—8% formic acid (3:5). The solution is refluxed for 1.5 hours. The reaction solution is evaporated under reduced pressure to remove the solvent. The residue is adsorbed on a silica gel-column. The column is eluted with chloroform, and eluates showing the Rf-value of 0.60 on a thin layer chromatograph of silica-gel (solvent: chloroform) are collected. The chloroform solution is evaporated to remove the solvent, and the residue is recrystallized from ethanol. 1.43 g. of the α-monoglyceride of α-methyl-p-stearyloxy-cinnamic acid are obtained. M.P. 90–92° C.
Infrared absorption spectrum:

$\nu_{cm.^{-1}}^{KBr}$: 3400 (OH)

Analysis. — Calculated for $C_{31}H_{52}O_5$ (percent): C, 73.76; H, 10.38. Found (percent): C, 73.81; H, 10.36.

EXAMPLE 20

A solution of 4.4 g. of p-stearyloxy-cinnamoyl chloride in 25 ml. of absolute benzene is added dropwise to a solution of 1.9 g. of trimethylene chlorohydrin in 15 ml. of absolute benzene. The addition is carried out at 50–60° C. for 30 minutes under stirring. The solution is refluxed for 2 hours. The reaction solution is evaporated under reduced pressure to remove the solvent. The residue is recrystallized from ethanol. 3.5 g. of the γ-chloropropyl ester of p-stearyloxy-cinnamic acid are obtained. M.P. 50–52° C.
Infrared absorption spectrum:

$\nu_{cm.^{-1}}^{KBr}$: 1710 (CO), 1635 (C=C)

Analysis.—Calculated for $C_{30}H_{49}O_3Cl$ (percent): C, 73.06; H, 10.01. Found (percent): C, 73.18; H, 10.03.

EXAMPLE 21

A solution of 3.65 g. of α-methyl-p-lauryloxy-cinnamoyl chloride in 15 ml. of absolute chloroform is added dropwise to a solution of 1.60 g. of 1,2-isopropylidene-glycerol and 2 ml. of pyridine in 20 ml. of absolute chloroform. The addition is carried out at room temperature for 30 minutes under stirring. The solution is then stirred for 3 hours at room temperature. The solution is washed with water and then evaporated to remove the solvent. The residue is dissolved in 80 ml. of ethanol—8% formic acid (3:5). The solution is refluxed for one hour and then evaporated to remove the solvent. The residue is adsorbed on a silica gel-column. The column is eluted with chloroform, and the fractions showing the Rf-value of 0.57 on a thin layer chromatography of silica gel (solvent: chloroform) are collected. The chloroform solution is evaporated to remove the solvent, and the residue is recrystallized from ethanol 1.28 g. of the α-monoglyceride of α-methyl-p-lauryloxy-cinnamic acid are obtained. M.P. 83–84° C.
Infrared absorption spectrum:

$\nu_{cm.^{-1}}^{KBr}$: 3400 (OH), 1700 (CO), 1633 (C=C)

Analysis. — Calculated for $C_{25}H_{40}O_5$ (percent): C, 71.39; H, 9.59. Found (percent): C, 71.51; H, 9.61.

EXAMPLE 22

A solution of 3.93 g. of α-methyl-p-myristyloxy-cinnamoyl chloride in 15 ml. of absolute chloroform is added dropwise to a solution of 1.6 g. of 1,2-isopropylidene-glycerol and 2 ml. of pyridine in 20 ml. of absolute chloroform. The addition is carried out at room temperature for 30 minutes under stirring. The solution is then stirred for 3 hours at room temperature. The solution is washed with water and then evaporated to remove the solvent. The residue is dissolved in 80 ml. of ethanol—8% formic acid (3:5). The solution is refluxed for 1.5 hours. The reaction solution is evaporated to remove the solvent. The residue is adsorbed on a silica gel-column. The column is eluted with chloroform, and the fractions showing the Rf-value of 0.58 on a thin layer chromatograph of silica gel (solvent: chloroform) are collected. The chloroform solution is evaporated to remove the solvent, and the residue is recrystallized from ethanol. 1.65 g. of the α-monoglyceride of α-methyl-p-myristyloxy-cinnamic acid are obtained. M.P. 84–86° C.
Infrared absorption spectrum:

$\nu_{cm.^{-1}}^{KBr}$: 3400 (OH)

Analysis.—Calculated for $C_{27}H_{44}O_5$ (percent): C, 72.28; H, 9.89. Found (percent): C, 72.53; H, 9.86.

EXAMPLE 23

A solution of 4.27 g. of α-phenyl-p-lauryloxycinnamoyl chloride in 30 ml. of absolute ether is added to a solution of 1.60 g. of β-hydroxyethyl methacrylate and 2 ml. of pyridine in 30 ml. of absolute ether. The addition is carried out for 30 minutes under ice-cooling and stirring. The solution is then stirred for 5 hours at room temperature. The solution is washed successively with water, 10% hydrochloric acid and an aqueous saturated solution of sodium bicarbonate. The solution is dried and then evaporated to remove the solvent. The crystals are recrystallized from ethanol. 4.56 g. of the β-methacryloyl-oxyethyl ester of α-phenyl-p-lauryloxy-cinnamic acid are obtained. M.P. 113–115° C.
Infrared absorption spectrum:

$\nu_{cm.^{-1}}^{KBr}$: 1708 (CO), 1630 (C=C)

Analysis.—Calculated for $C_{33}H_{44}O_5$ (percent): C, 76.12; H, 8.52. Found (percent): C, 75.98; H, 8.46.

EXAMPLE 24

3.65 g. of α-methyl-p-lauryloxy-cinnamoyl chloride are dissolved in 30 ml. of absolute benzene. 1.63 g. of sodium isethionate are added to the solution and the solution is refluxed for 6 hours. The precipitated crystals are collected by filtration. The crystals are recrystallized from 70% ethanol. 3.86 g. of sodium β-(α-methyl-p-lauryloxy-cinnamoyloxy)-ethyl sulfonate are obtained. M.P. 300° C.
Infrared absorption spectrum:

$\nu_{cm.^{-1}}^{KBr}$: 1710 (CO), 1635 (C=C)

Analysis.—Calculated for $C_{24}H_{37}O_6SNa$ (percent): C, 60.48; H, 7.87; S, 6.73. Found (percent): C, 60.51; H, 7.93; S, 6.92.

EXAMPLE 25

A solution of 3.9 g. of p-myristyloxy-cinnamoyl chloride in 20 ml. of absolute ether is added to a solution of

11

1.0 g. of ethylene chlorohydrin and one ml. of pyridine in 15 ml. of absolute ether. The addition is carried out for 20 minutes under ice-cooling and stirring. The solution is then stirred for 2 hours at room temperature. The solution is washed with water, dried and evaporated to remove the solvent. The crystallized residue is allowed to stand at room temperature, then it is recrystallized from ethanol. 2.35 g. of the β-chloroethyl ester of p-myristyloxy-cinnamic are obtained. M.P. 65–67° C.

Infrared absorption spectrum:

$\nu_{cm.^{-1}}^{KBr}$: 1706 (CO), 1634 (C=C, sh), 1605 (C=C)

*Analysis.*—Calculated for $C_{25}H_{39}O_3Cl$ (percent): C, 70.98; H, 9.29; Cl, 8.38. Found (percent): C, 70.91; H, 9.30; Cl, 8.11.

EXAMPLE 26

A solution of 5.1 g. of silver nitrate in 15 ml. of water is added to a solution of 4.23 g. of the β-chloroethyl ester of p-myristyloxy-cinnamic acid in 100 ml. of ethanol. The resultant solution is refluxed for 2 hours. The insoluble materials are removed by filtration. The filtrate is concentrated under reduced pressure. The residue is extracted with benzene and the extract is evaporated to remove the solvent. The residue is adsorbed on an alumina-column. The column is eluted with benzene, and eluates showing the Rf-value of 0.22 g. on a thin layer chromatography of alumina (solvent: benzene) are collected. The benzene solution is evaporated to remove the solvent, and the residue is recrystallized from ethanol. 1.48 g. of the β-hydroxy-ethyl ester of p-myristyloxy-cinnamic acid are obtained. M.P. 70–71° C.

Infrared absorption spectrum:

$\nu_{cm.^{-1}}^{KBr}$: 3400 (OH), 1705 (CO), 1631 (C=C)

*Analysis.*—Calculated for $C_{25}H_{39}O_3Cl$ (percent): C, 74.21; H, 9.97. Found (percent): C, 74.19; H, 10.01.

EXAMPLE 27

A solution of 4.5 g. of α-methyl-p-stearyloxy-cinnamoyl chloride in 25 ml. of absolute benzene is added dropwise to a solution of 1.9 g. trimethylene chlorohydrin in 15 ml. of absolute benzene. The addition is carried out at 50–60° C. for about 30 minutes under stirring. The solution is then refluxed for 2 hours. The reaction solution is concentrated under reduced pressure. The residue thus obtained is recrystallized from ethanol. 3.9 g. of the γ-chloropropyl ester of α-methyl-p-stearyloxy-cinnamic acid are obtained. M.P. 49–50° C.

Infrared absorption spectrum:

$\nu_{cm.^{-1}}^{KBr}$: 1709 (CO), 1633 (C=C)

*Analysis.*—Calculated for $C_{31}H_{51}O_3Cl$ (percent): C, 73.41; H, 10.12. Found (percent): C, 73.45; H, 10.21.

EXAMPLE 28

A solution of 5.1 g. of silver nitrate in 10 ml. of water is added to a solution of 5.1 g. of the γ-chloropropyl ester of α-methyl-p-stearyloxy-cinnamic acid in 100 ml. of ethanol. The solution is refluxed on a water bath for 7 hours under stirring. The insoluble materials are removed by filtration. The filtrate is concentrated under reduced pressure. The residue is dried and then dissolved in hot benzene. The insoluble materials are removed by filtration. The filtrate is concentrated to dryness and the residue thus obtained is recrystallized from ethanol. 2.50 g. of the γ-hydroxypropyl ester of α-methyl-p-stearyloxy-cinnamic acid are obtained. M.P. 92–94° C.

Infrared absorption spectrum:

$\nu_{cm.^{-1}}^{KBr}$: 3380 (OH), 1710 (CO), 1635 (C=C)

*Analysis.*—Calculated for $C_{31}H_{52}O_4$ (percent): C, 76.18; H, 10.72. Found (percent): C, 75.96; H, 10.89.

12

What is claimed is:
1. A compound represented by the formula:

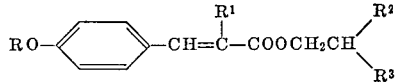

wherein R is phenyl or an alkyl radical having from 12 to 18 carbon atoms, $R^1$ is hydrogen, methyl or phenyl, $R^2$ is hydrogen or hydroxy, $R^3$ is hydroxymethyl when $R^2$ is hydroxy, or $R^3$ is a radical selected from the group consisting of methacryloyloxy, halomethyl, hydroxymethyl, hydroxy, halogen and a radical of the formula: —$SO_3Me$ when $R^2$ is hydrogen, and Me is an alkali metal.

2. The compound, as described in claim 1, wherein R is phenyl or cetyl, $R^1$ is hydrogen or methyl, and $R^3$ is a radical selected from the group consisting of methacryloyloxy, chloromethyl, hydroxymethyl, hydroxy, chlorine and a radical of the formula: —$SO_3Na$ when R is hydrogen.

3. The compound, as described in claim 1, wherein R is cetyl, $R^1$ and $R^2$ are hydrogen and $R^3$ is methacryloyloxy.

4. The compound, as described in claim 1, wherein R is cetyl, $R^1$ and $R^2$ are hydrogen and $R^3$ is chloromethyl.

5. The compound, as described in claim 1, wherein R is cetyl, $R^1$ is hydrogen, R is hydroxy and $R^3$ is hydroxymethyl.

6. The compound, as described in claim 1, wherein R is cetyl, $R^1$ is methyl, $R^2$ is hydrogen and $R^3$ is methacryloyloxy.

7. The compound, as described in claim 1, wherein R is cetyl, $R^1$ and $R^2$ are hydrogen and $R^3$ is hydroxy.

8. The compound, as described in claim 1, wherein R is phenyl, $R^1$ and $R^2$ are hydrogen and $R^3$ is chloromethyl.

9. The compound, as described in claim 1, wherein R is cetyl, $R^1$ and $R^2$ are hydrogen and $R^3$ is hydroxymethyl.

10. The compound, as described in claim 1, wherein R is cetyl, $R^1$ and $R^2$ are hydrogen and $R^3$ is a radical of the formula: —$SO_3Na$.

11. The compound, as described in claim 1, wherein R is cetyl, $R^1$ and $R^2$ are hydrogen and $R^3$ is chlorine.

12. The compound as described in claim 1 wherein R is lauryl, $R^1$ is methyl, $R^2$ is hydroxy, and $R^3$ is hydroxymethyl.

13. The compound as described in claim 1 wherein R is myristyl, $R^1$ is methyl, $R^2$ is hydroxy, and $R^3$ is hydroxymethyl.

14. The compound as described in claim 1 wherein R is cetyl, $R^1$ is methyl, $R^2$ is hydrogen, and $R^3$ is chlorine.

15. The compound as described in claim 1 wherein R is cetyl, $R^1$ is methyl, $R^2$ is hydroxy, and $R^3$ is hydroxymethyl.

References Cited

UNITED STATES PATENTS 3,002,992    10/1961    Wood _____ 280—473 R

OTHER REFERENCES

March: "Adv. Org. Chem.," McGraw-Hill, N.Y. (1968), pp. 306, 303, 319.

Rudenko et al.: C.A. 63, 4197a (1963).

Gray et al.: C.A. 49, 4577d (1955).

LORRAINE A. WEINBERGER, Primary Examiner

J. F. TERAPANE, Assistant Examiner

U.S. Cl. X.R.

424—308